United States Patent [19]

Newby et al.

[11] 4,376,397

[45] Mar. 15, 1983

[54] APPARATUS FOR VARIABLY SPACING A DRIVING TOOL AND A DRIVEN TOOL

[76] Inventors: Robert A. Newby, 2339 N. 30th Pl.; Gregg E. York, 2101 N. 28th St., both of Phoenix, Ariz. 85008

[21] Appl. No.: 234,363

[22] Filed: Feb. 13, 1981

[51] Int. Cl.[3] ........................ B25B 23/16; B25G 1/04; F16B 7/14

[52] U.S. Cl. .................................. 81/177 A; 403/107; 403/109; 16/115

[58] Field of Search ......................... 81/177 R, 177 A; 16/115; 403/107, 109

[56] References Cited

U.S. PATENT DOCUMENTS

| | | | |
|---|---|---|---|
| 1,028,126 | 6/1912 | Meredith | 81/177 A |
| 1,030,592 | 6/1912 | Leland | 81/177 A |
| 1,204,515 | 11/1916 | Smith | 81/168 |
| 1,284,351 | 11/1918 | Jagielo | 81/177 A |
| 2,963,930 | 12/1960 | Clothier et al. | 81/177 A |
| 3,306,639 | 2/1967 | Lyon | 81/177 A |

*Primary Examiner*—Roscoe V. Parker
*Attorney, Agent, or Firm*—Harry M. Weiss

[57] ABSTRACT

This disclosure relates a torque-transmitting extension device which has an adjustable length so that only a single extension is required to drivably access rotatable members from various distances.

2 Claims, 7 Drawing Figures

APPARATUS FOR VARIABLY SPACING A DRIVING TOOL AND A DRIVEN TOOL

BACKGROUND OF THE INVENTION

1. Field of the Invention

This invention relates generally to extension tools, and more specifically to an extension tool which permits a driving tool to be selectively spaced from a driven tool.

2. Description of the Prior Art

In the past, the mechanical tools, have been widely used for servicing mechanical and electrical equipment. Typical examples of such mechanical tools include sockets, ratchets impact wrenches and similar implements. While equipment can almost invariably be serviced by disassembling the respective parts in the same order in which they were assembled, it is often more convenient and reasonable to disassemble the equipment in some other sequence. An example of such an alternate sequence would be to remove the transmission of a vehicle, without also removing the engine. However, access to the fasteners which couple the transmission to the engine was often severely limited by the adjacent portions of the vehicle. To permit the required access to remove all of the fasteners, such devices as universal joints and extensions were developed. Such devices typically were provided with a recess formed to engage the drive lug of a ratchet or other driving tool, and were also provided with a drive lug duplicating the drive lug of the driving tool so that another socket or similar tool could be driven. To provide access to such fasteners from various distances, it was necessary for a person performing the service to have a series of various fixed-length extensions. While the necessity for such a multiplicity of tools was in and of itself a cost problem, another acute problem was presented when attempting a repair when the tool box was inconveniently out of reach. For example, when working under a vehicle to remove the transmission, the person performing the operation was faced with a choice between taking all of the extensions which might be necessary for the operation, or possibly having to make repeated time and energy-wasting trips to the tool box to obtain the proper extension. A need existed for a single torque-transmitting extension which could be varied in length to allow fasteners to be drivably accessed from various distances.

SUMMARY OF THE INVENTION

Figures 1, 2, 3, 4, 5, 6, 7:
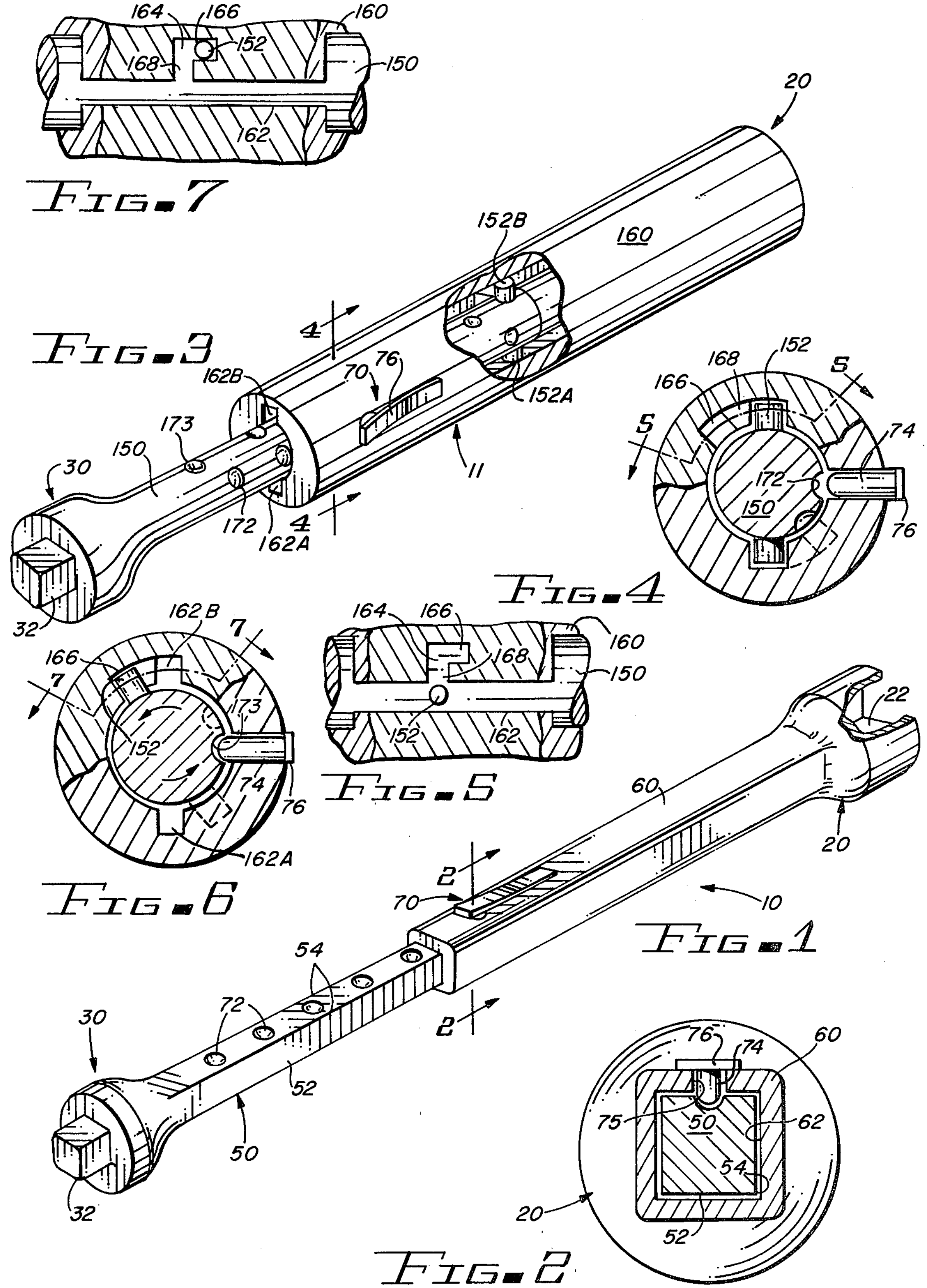
FIG. 1 is a perspective view of a first embodiment of a variable length extension apparatus.
FIG. 2 is an enlarged sectional view taken along line 2—2 of FIG. 1.
FIG. 3 is a perspective view of a second embodiment of a variable length extension apparatus.
FIG. 4 is a sectional view taken along line 4—4 of FIG. 3 with portions removed for clarity.
FIG. 5 is a sectional view taken along line 5—5 of FIG. 4.
FIG. 6 is a sectional view taken along line 4—4 of FIG. 3 with the variable length extension shown locked at a particular length.
FIG. 7 is a sectional view taken along line 7—7 of FIG. 6.

In accordance with one embodiment of this invention, it it an object to provide a variable length extension apparatus.

It is another object to provide a variable length extension apparatus capable of transmitting torque.

It is a further object to provide a variable length extension apparatus having a retaining mechanism to permit the extension to be secured at various incremental lengths.

It is again another object to provide a variable length extension apparatus having the capability to reversibly transmit torque.

It is still a further object to provide a variable length extension apparatus capable of withstanding compressive force without collapsing.

DESCRIPTION OF THE PREFERRED EMBODIMENTS

In accordance with one embodiment of this invention, an adjustable extension is disclosed, comprising: driver socket means for engaging a driving tool; driven socket means for engaging a driven tool; and adjusting means for coupling the driver socket means and the driven socket means and further for permitting a controllably variable spacing of the driver socket means and the driven socket means.

In accordance with another embodiment of this invention, a method for variably spacing a driving tool form a driven tool is disclosed, comprising the steps of: providing a first member engaging said driving tool; providing a second member engaging the driven tool; slidably engaging the first member and the second member; and securing the first and second members in a fixed rotational relationship.

The foregoing and other objects, features and advantages of this invention will be apparent from the following more particular description of the preferred embodiments of the invention as illustrated in the accompanying drawings.

THE SPECIFICATION

Referring to FIG. 1, a respective view of a first embodiment of an adjustable extension is shown generally by reference number 10. The adjustable extension 10 is provided with driver socket means shown generally by reference number 20, driven socket means shown generally by reference number 30 and adjusting means for coupling and for permitting a variable spacing of the driver socket means 20 and the driven the socket means 30. The driver socket means 20 are for engaging a driving tool. Preferably, the driver socket means 20 are provided with a drive aperture 22, formed to receive the drive lug, for example, of a conventional ratchet. The driven socket means 30 are for engaging a driven tool, such as a conventional socket. Preferably, the driven socket means 30 are provided with a drive lug 32.

The adjusting means of the first embodiment 10 include a lever means for permitting a reversible transmission of torque from the driver socket means 20 to the driven socket means 30, and also include securing means 70 for selectively retaining the driver socket means 20 at a particular spacing from the driven socket means 30.

Referring also to FIG. 2, a sectional view taken along line 2—2 of FIG. 1 is shown. In the first embodiment 10, the lever means are comprised of a male member 50 which is provided with sides 52 and corners 54, and a female member 60 which is provided with an internal aperture 62 having a geometric similarity to the configuration of the male member 50. The male member 50 is slidably mounted within the aperture 62 of the female member 60, and the corners 54 of the male member 50 engage the aperture 62 when torque is applied to either the driver socket means 20 or the driven socket means 30. Thus, the male member 50 and the female member 60 remain in a fixed rotational relationship and torque can be effectively transmitted with the adjustable extension 10.

The securing means 70 permit the driver socket means 20 to be spaced at various incremental distances from the driven socket means 30. The securing means 70 are provided with a plurality of detents 72 incrementally spaced along the length of the male member 50. The securing means 70 are additionally provided with a latch member 74 which passes through aperture 75 in the female member 60. The latch member 74 is biased to tend to enter the detents 72 by a spring member 76, anchored to the female member 60. In this manner, manual force can be applied to overcome the tendency of the spring member 76 to engage the latch members 74 in one of the detents 72, thereby permitting the driver socket means 20 to be variably spaced from the driven socket means 20. While the driver socket means 20 is shown coupled to the female member 60, and the driven socket means 30 is shown coupled to the male member 50, those respective couplings could be reversed in a particular application.

Referring then to FIG. 3, a perspective view of a second embodiment of an adjustable extension is shown generally by reference number 11, with portions removed for clarity. As in the first embodiment 10, the second embodiment 11 is also provided with driver socket means 20, driven socket means 30, and the adjusting means having the lever means and the securing means 70. The lever means of the second embodiment are provided with a male member 150, and pins 152 protruding from the male member 150. A pair of the pins 152 are respectively shown by reference numbers 152A, 152B. The pins 152 can be traversed through the length of the female member 160 by passing through the longitudinal transport slots 162A, 162B. The lever means also include a female member 160 which is provided with a central bore and and a series of spaced internal slots 164 (refer also to FIGS. 3–7) which are disposed in pairs to receive the pins 152A, 152B.

Referring further to FIG. 4, a sectional elevational view taken along line 4—4 of FIG. 3 is shown, with portions removed to reveal the further details of one of the internal slots 164. One of the pins 152 is shown located in first of the longitudinal transport slots 162. The slots 164 can be located by translating the male member 150 within the central bore of the female member 160, while simultaneously attempting to rotate the members 150, 160 relative to one another to "feel" the location of the slots 164 when the pins 152 enter the slots 164. The pair of pins 152 can be more positively located adjacent to a pair of the internal slots 164 by biasing the latch member 74 into a locating detent 172 as shown. The bias is provided by the spring 76. The locating detent 172 is one of the plurality of such detents, which are spaced to permit the user of the extension 11 to locate the respective internal slots 164 by the feel of the latch 74 entering one of the sequential detents 172 (refer also to FIG. 5) when traversing the pins 152 in the respective transport slots 162.

Referring further to FIG. 5, a sectional view taken along line 5—5 of FIG. 4 is shown. The lever means are shown further comprised of the internal slots 164 each having an engagement portion 166, which can be accessed by the pin 152 from the transport slot 162 through an entry portion 168. With an appropriate combination of rotation and translation between the male member 150 and the female member 160, the pins 152 can be manually secured in the engagement portions 166 (refer also to FIG. 7) to permit the extension 11 to reversibly transmit torque, and also to transmit compressive force.

Referring then to FIG. 6, another sectional view taken along line 4—4 of FIG. 3 is shown with portions removed to reveal one of the pins 152 located in the engagement portion 166 of one of the internal slots 164. Referring also to FIG. 7, a sectional view taken along line 7—7 of FIG. 6 is shown. The engagement of one of the pins 152 in the engagement portion 166 to permit the reversible transmission of torque, is clearly illustrated.

While the pins 152 could be manually retained in the slots 164, and particularly in the engagement portion 166, to permit the reversible transmission of torque, the securing means are preferably comprised of the male member 150 being also provided with a second plurality of detents 173 (refer also to FIG. 3), which are individually engaged by the latch member 74 when a pair of the pins 152 is fully entered into a pair of the engagement portions 166 of the slots 164. In this manner, the walls of internal slots 164 restrain the pins 152 against torsional and compressive loads, and the combination of the latch 74 and one of the detents 173 at least maintain the pins 152 in the engagement portions 166 against gravitational forces.

While the invention has been particularly described and shown in reference to the preferred embodiments thereof, it will be understood by those skilled in the art that various changes in form and detail and omissions may be made therein without departing from the spirit and scope of the invention.

What is claimed is:

1. An adjustable extension, comprising:

driver socket means for engaging a driving tool;

driven socket means for engaging a driven tool; and adjusting means for coupling said driver socket means and said driven socket means and further for permitting a controllably variable spacing of said driver socket means and said driven socket means, said adjusting means comprising lever means for permitting a reversible transmission of torque from said driver socket means to said driven socket means, said lever means comprising:

a male member having a longitudinal axis, an arcuate surface symmetrically disposed about said axis, and at least a first pin projecting laterally from said surface;

a female member having a longitudinal aperture slidably disposed about said male member, said female member further having a first logitudinal slot provided with a continuous opening to said aperture so that said pin is at least selectively free to translate in said slot;

said female member further having a plurality of second slots individually having an opening to said first slot and further individually having incremental spacing along the surface of said logitudinal aperture so that said pin can be inserted in a particular one of said second slots by rotating said male member with respect to said female member to establish a fixed rotational relationship between said male and female members, said second slots each having a first portion open to said first slot and a second portion orthogonally disposed to said first portion, said lever means comprising retaining means for selectively retaining said pin at the terminus of one of said second slots, said adjusting means comprising said pin and said plurality of second slots, said adjusting means comprising locating means for releasably aligning said pin with one of said second slots, said retaining means comprising:

said female member having a latch member said female member further provided with spring means for biasing said latch member against the surface of said male member; and a first plurality of detents spaced along the length of said male member so that the entry of said latch member into one of said detents firmly locates said pin at said terminus, aid locating means comprising a second plurality of detents located along the length of said male member so that entry of said latch member into one of said second plurality of detents locates said pin within said first slot at the opening to one of said second slots.

2. An adjustable extension according to claim 1 wherein individual ones of said first plurality of detents and individual ones of said second plurality of detents having a spatial relationship in pairs on the surface of said male member geometrically similar to the relationship of said second slot terminus to said second slot opening.

* * * * *